United States Patent
Griffin et al.

(10) Patent No.: US 6,766,271 B2
(45) Date of Patent: Jul. 20, 2004

(54) INFRARED OUT-OF-POSITION DETECTION SYSTEM AND METHOD FOR A VEHICLE RESTRAINT SYSTEM

(76) Inventors: Dennis P. Griffin, 134 Maplewood Dr., Noblesville, IN (US) 46060; William W. Fultz, 11110 North Woodbury Dr., Carmel, IN (US) 46033; Cunkai Wu, 33673 Chatsworth Dr., Sterling Heights, MI (US) 48312

( * ) Notice: Subject to any disclaimer, the term of this patent is extended or adjusted under 35 U.S.C. 154(b) by 0 days.

(21) Appl. No.: 10/424,374

(22) Filed: Apr. 28, 2003

(65) Prior Publication Data

US 2003/0204363 A1 Oct. 30, 2003

(51) Int. Cl.$^7$ .......................... G01B 11/00; B60R 21/00
(52) U.S. Cl. ................ 702/150; 702/152; 702/159; 702/172; 701/45; 701/46; 280/735; 356/622
(58) Field of Search ................... 702/155, 156, 702/104, 116, 150, 152, 159, 172; 280/730.1, 734, 735; 701/45–46, 49; 180/268, 269, 271; 356/375–376, 614, 621, 622; 340/561, 565

(56) References Cited

U.S. PATENT DOCUMENTS

| | | | |
|---|---|---|---|
| 5,330,226 A | | 7/1994 | Gentry et al. ............... 280/735 |
| 5,482,314 A | * | 1/1996 | Corrado et al. ............. 280/735 |
| 5,737,083 A | | 4/1998 | Owechko et al. ........... 356/375 |
| 5,785,347 A | | 7/1998 | Adolph et al. .............. 380/735 |
| 6,018,693 A | * | 1/2000 | Blackburn et al. ............ 701/45 |
| 6,094,610 A | * | 7/2000 | Steffens et al. ............... 701/45 |
| 6,113,137 A | | 9/2000 | Mizutani et al. ............ 280/735 |
| 6,166,625 A | * | 12/2000 | Teowee et al. ........ 340/426.26 |
| 6,298,311 B1 | * | 10/2001 | Griffin et al. ............... 702/150 |

* cited by examiner

*Primary Examiner*—Bryan Bui
(74) *Attorney, Agent, or Firm*—Jimmy L. Funke; Stefam V. Chmielewski

(57) ABSTRACT

An improved infrared occupant detection system that provides accurate and reliable occupant intrusion information at a speed sufficient to timely inhibit or otherwise control deployment of occupant restraints. An array of infrared emitters is selectively activated to emit a predetermined pattern of IR beams in an area between the passenger seat and the point of deployment of the restraint, and the reflected IR energy is detected by a photo-sensitive receiver and analyzed to determine whether an occupant is out of position for deployment of the restraint. In the preferred embodiment, the intensity of the received beam energy and the position of the respective beam are used to construct a table of individual intrusion factors, and a composite intrusion factor based on the individual intrusion factors is categorized by magnitude to form an indication of occupant intrusion level, which in turn, is used to determine whether, or how forcefully, to deploy the restraint in the event of a serious crash.

16 Claims, 3 Drawing Sheets

INFRARED OUT-OF-POSITION DETECTION SYSTEM AND METHOD FOR A VEHICLE RESTRAINT SYSTEM

TECHNICAL FIELD

This invention relates to a motor vehicle inflatable restraint system, and more particularly to a system and method for detecting an out-of-position occupant.

BACKGROUND OF THE INVENTION

Vehicle occupant position detection systems are useful in connection with air bags and other pyrotechnically deployed restraints as a means of judging whether, and/or how forcefully, to deploy the restraint. Ideally, the system should be capable of classifying the type of occupant (i.e., large adult, small adult, child, etc.) and the position of the occupant relative to the point of deployment of the air bag. Various systems incorporating one or more infrared and/or acoustical ranging sensors have been proposed for this purpose; see, for example, the U.S. Pat. Nos. 5,330,226, 5,785,347, 5,737,083 and 6,113,137. In general, such systems emit one or more beams of infrared energy to define a corresponding number of viewing fields, and detect the received energy to determine occupant presence and position within the viewing fields. Unfortunately, such systems tend to be quite costly, and are difficult to package in the automotive environment. Moreover, a relatively high speed of response is required so that deployment can be properly inhibited or allowed when the occupant position quickly changes, possibly in anticipation of an impending collision. Accordingly, what is needed is a low-cost system that accurately and occupant position quickly changes, possibly in anticipation of an impending collision. Accordingly, what is needed is a low-cost system that accurately and quickly characterizes occupant intrusion into a defined out-of-position area for purposes of deciding whether, or how forcefully, to deploy an inflatable restraint in the event of a serious crash.

SUMMARY OF THE INVENTION

The object of this invention is directed to an improved infrared (IR) occupant detection system that is low in cost, and provides accurate and reliable occupant intrusion information at a speed sufficient to timely inhibit or otherwise control deployment of occupant restraints. An array of IR emitters is selectively activated to emit a predetermined pattern of IR beams in an area between the passenger seat and the point of deployment of the restraint, and the reflected IR energy is detected by a photo-sensitive receiver and analyzed to determine whether an occupant is out of position for deployment of the restraint. In the preferred embodiment, the intensity of the received beam energy and the position of the respective beam are used to construct a table of individual intrusion factors, and a composite intrusion factor based on the individual intrusion factors is categorized by magnitude to form an indication of occupant intrusion level, which in turn, is used to determine whether, or how forcefully, to deploy the restraint in the event of a serious crash.

BRIEF DESCRIPTION OF THE DRAWINGS

FIG. 3 depicts a routine for activating an IR emitter and receiving a reflected IR signal. FIG. 5 details a portion of the routine of FIG. 3 concerning intrusion evaluation of the received signals.

DESCRIPTION OF THE PREFERRED EMBODIMENT

Figure 1A:
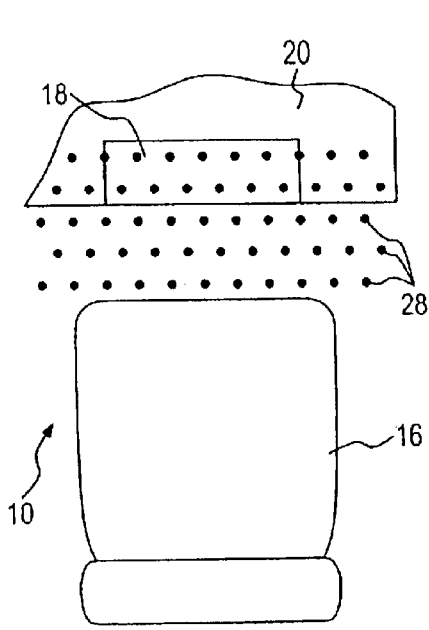
FIGS. 1A and 1B respectively illustrate side and overhead views of a portion of the passenger compartment of a motor vehicle equipped with an inflatable restraint and an infrared out-of-position detection system according to this invention.
Figure 1B:
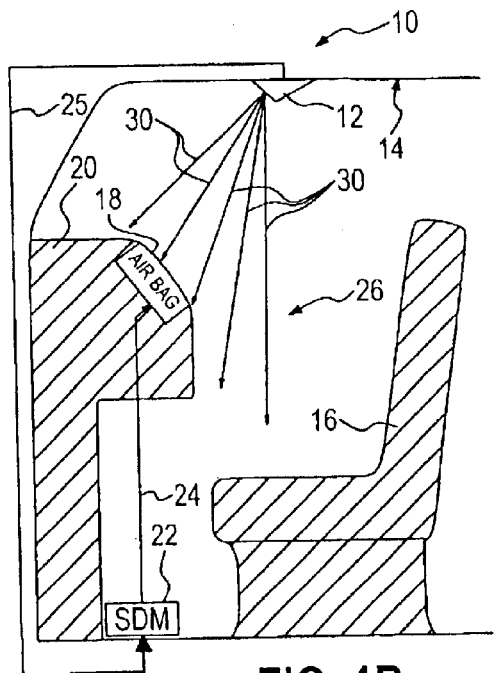

Referring to the drawings, and particularly to FIGS. 1A and 1B, the reference numeral 10 generally designates the passenger compartment of a vehicle equipped with an occupant out-of-position detection system according to this invention. In the illustrated embodiment, the out-of-position detection system is mechanized as a single module 12, mounted in a ceiling or headliner area 14 above a passenger seat 16, possibly in a central console. Obviously, other packaging arrangements or mounting locations are also possible, but the illustrated location is generally preferred because it is least intrusive and easy to package. Of course, the vehicle may have a bench-style seat instead of the illustrated bucket seat 16; in any event, the vehicle manufacturer defines the normal occupant positions on the seats.

In general, the out-of-position detection system of this invention is described herein in the context of an otherwise conventional supplemental inflatable restraint system, including an air bag 18 installed in the instrument panel 20 forward of the passenger seat 16, and a Sensing and Diagnostic Module (SDM) 22 for electrically deploying the air bag 18 via line 24 in the event of a severe crash. The module 12 interacts with the restraint system by scanning an out-of-position zone 26 between the seat 16 and the point of deployment of air bag 18, and supplying an out-of-position signal to SDM 22 via line 26. The scanning involves selectively activating IR sources within the module 12 to direct beams of IR energy at predefined points in the out-of-position zone, as represented by the dots 28 in FIG. 1A and the beams 30 in FIG. 1B, and receiving and evaluating the IR energy reflected back to module 12. In the illustrated embodiment, the evaluation involves constructing a table of individual intrusion factors based on the reflected energy from each of a number of points in the out-of-position zone 26, forming a composite intrusion factor based on the individual intrusion factors, and categorizing the composite intrusion factor by magnitude to form the out-of-position signal supplied to SDM 22. The out-of-position signal indicates the extent of occupant intrusion into the out-of-position zone 26, and the SDM 22 uses the signal to determine whether, or how forcefully, to deploy the air bag 18 in the event of a serious crash. Of course, the criteria for determining whether, or how forcefully, to deploy the air bag 18 are outside the scope of this invention, and are generally defined by the vehicle manufacturer or governmental regulation.

Figure 2:
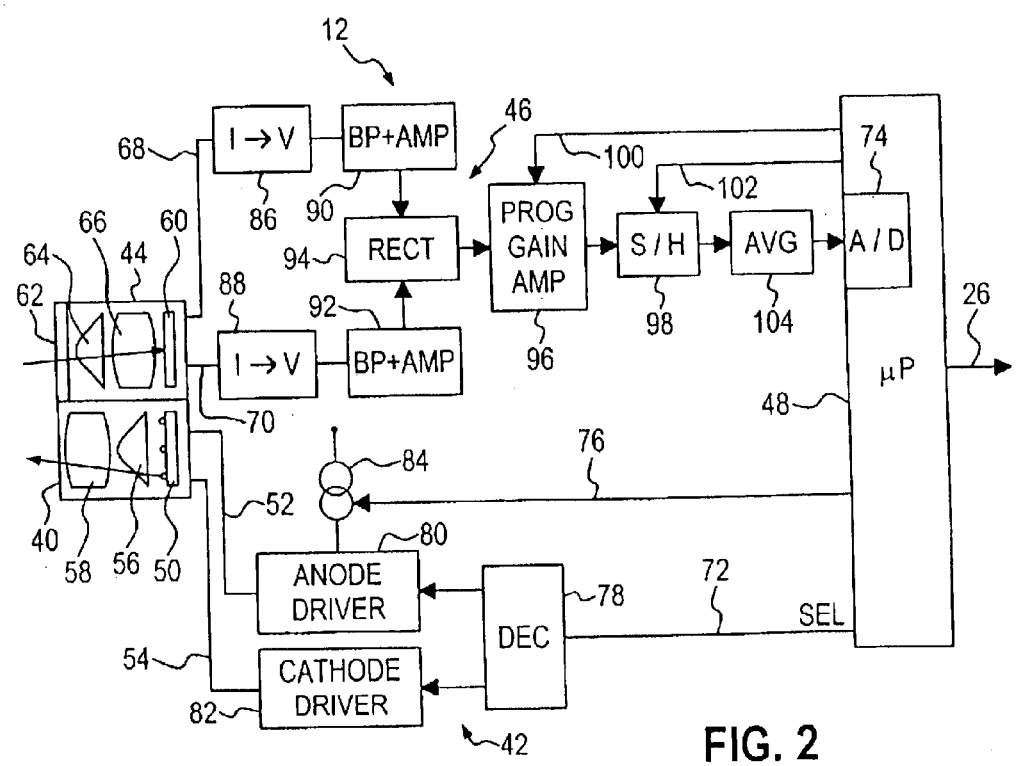
FIG. 2 is a block diagram of the system of FIG. 1, including a microprocessor-based controller.

FIG. 2 is a block diagram of components and circuitry housed within the module 12 of FIG. 1B, including an IR emitter 40, a driver circuit 42 for activating the emitter 40, an IR receiver 44, a receiver circuit 46 for processing the output signals generated by the receiver 44 to form a beam intensity signal, and a microprocessor 48 for activating the driver circuit 42, receiving the beam intensity signal from receiver circuit 46 and regulating the gains of the driver and receiver circuits 42, 46.

The emitter 40 includes a two-dimensional array 50 of IR LEDs arranged in a rectangular grid several columns wide and several rows in length, so that an individual LED of the array 50 is activated by energizing the respective row and column (anode and cathode) drive lines 52 and 54. The emitter 40 also includes a lens system comprising an aspheric element 56 for concentrating IR light emitted from the array 50, and a symmetrical convex lens 58 for focusing the light on the intended illumination area. Similarly, the receiver 44 includes a two-dimensional array 60 of photo-diodes, and a lens system comprising an IR filter 62, an aspheric element 64 for imaging the received IR light, and a symmetrical convex lens 66 for focusing the imaged light on the array 60. In the illustrated embodiment, the array 60 actually includes two sub-arrays having an overlapping zone of coverage, with one array being tuned to respond primarily to objects relatively close to the module 12 and producing an intensity output signal on line 68, and the other array being tuned to respond primarily to objects relatively far away from the module 12 and producing an intensity output signal on line 70.

In general, the microprocessor 48 signals driver circuit 42 to activate a selected LED element of emitter array 50 via select (SEL) line 72, controls the receiver circuit 46 to synchronously detect and capture the reflected signal intensity, and evaluates the beam intensity signal received at its A/D port 74. The selected LED element of array 50 is activated with a pulse of high frequency sinusoidal current to produce an intensity modulated IR light beam focused on a designated area of the out-of-position zone 26 illustrated in FIGS. 1A–1B. The frequency of the activation current is fixed, but its magnitude is controlled by the microprocessor 48 via line 76 to compensate for variations in the strength of the received signal, as explained below. A decoder 78 receives a Select input on SEL line 72, and activates semiconductor switch elements in the anode and cathode driver circuits 80 and 82 corresponding to the row-by-column address of the selected LED element. The anode driver circuit 80 couples the respective row drive line 52 to a programmable current source 84, which develops and outputs a sinusoidal drive current at the magnitude dictated by microprocessor 46 via line 76. The cathode drive circuit 82 couples the respective column drive line 54 to the system common or ground.

When the emitter 40 produces an IR light pulse, a reflected light pulse at the same frequency (intensity modulation) is returned to receiver 44, and the photo-diode sub-arrays 60 produce the near-zone and far-zone current signals on lines 68 and 70. The receiver circuit 46 extracts the relevant signal components corresponding to the reflected IR light pulse by converting the array current signals to voltage signals with I/V conversion circuits 86, 88 and band-pass filtering and amplifying the voltage signals with the band-pass filter and amplifier circuits 90, 92. The components of the photo-diode current signals corresponding to the reflected IR light pulse have a characteristic frequency corresponding to the intensity modulation of the emitted IR light pulse (i.e., the frequency of current source 84), and the band pass filters 90, 92 pass only the desired components of the corresponding voltage signals, and reject all other components as noise. The extracted and amplified intensity signals are then combined and rectified by rectifier 94, and then amplified by Programmable Gain Amplifier 96, providing amplified input voltages to sample-and-hold (S/H) circuit 98. As explained below, the gain of Programmable Gain Amplifier 96 is controlled by the microprocessor 48 via line 100 to compensate for variations in the amplitude of the received intensity signals. The microprocessor 48 triggers the S/H circuit 198 via line 102 in synchronism with the LED activation pulses, and the captured signal values are provided as inputs to the Averaging circuit 104, which in turn provides the beam intensity input signal to the microprocessor A/D port 74. The Averaging circuit 104 is required because the microprocessor 48 typically triggers the S/H circuit 98 two or more times in succession for improved accuracy.

Figure 3:
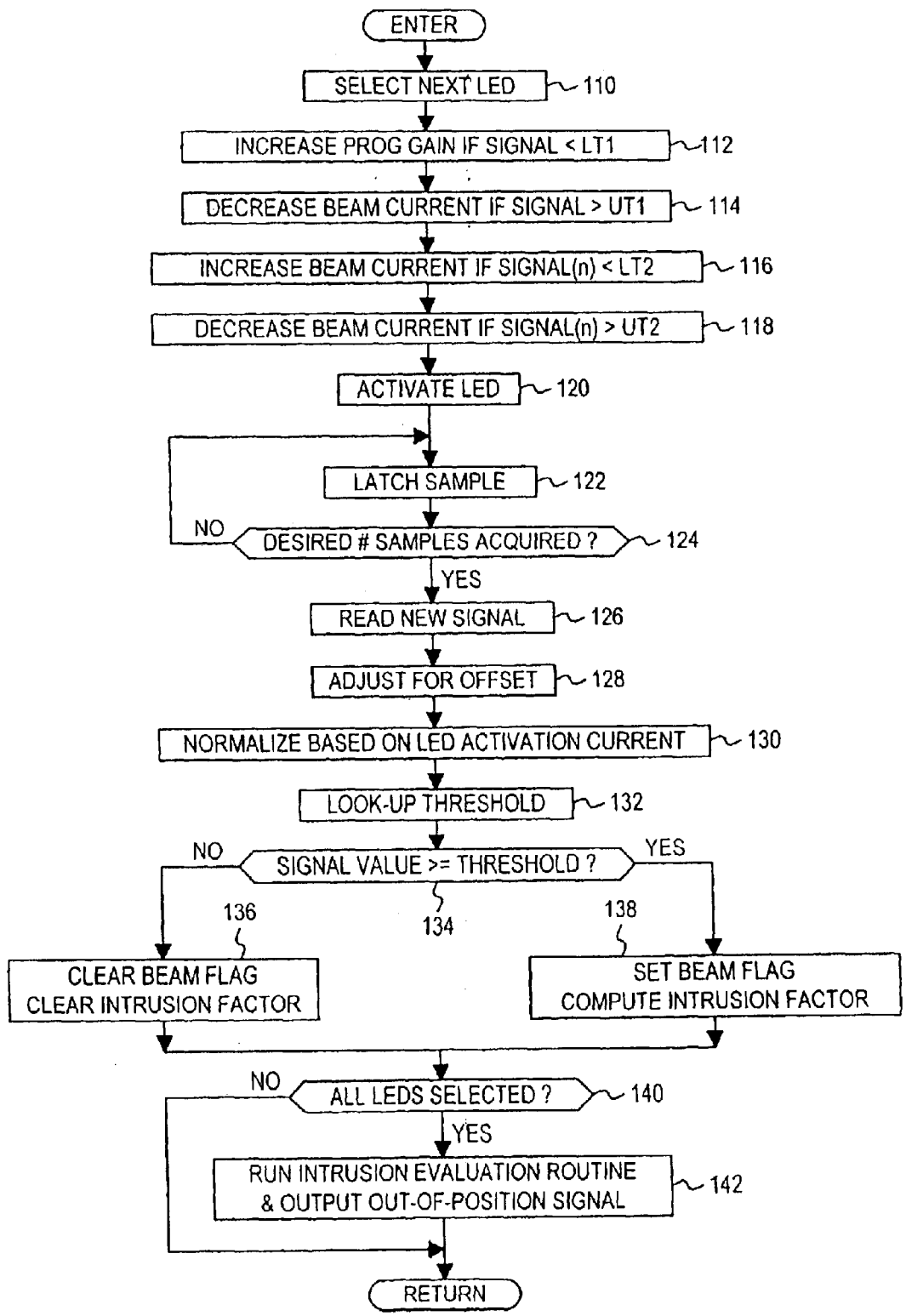
FIGS. 3 and 5 are flow diagrams representative of software routines periodically executed by the microprocessor-based controller of FIG. 2.
Figures 4, 5:
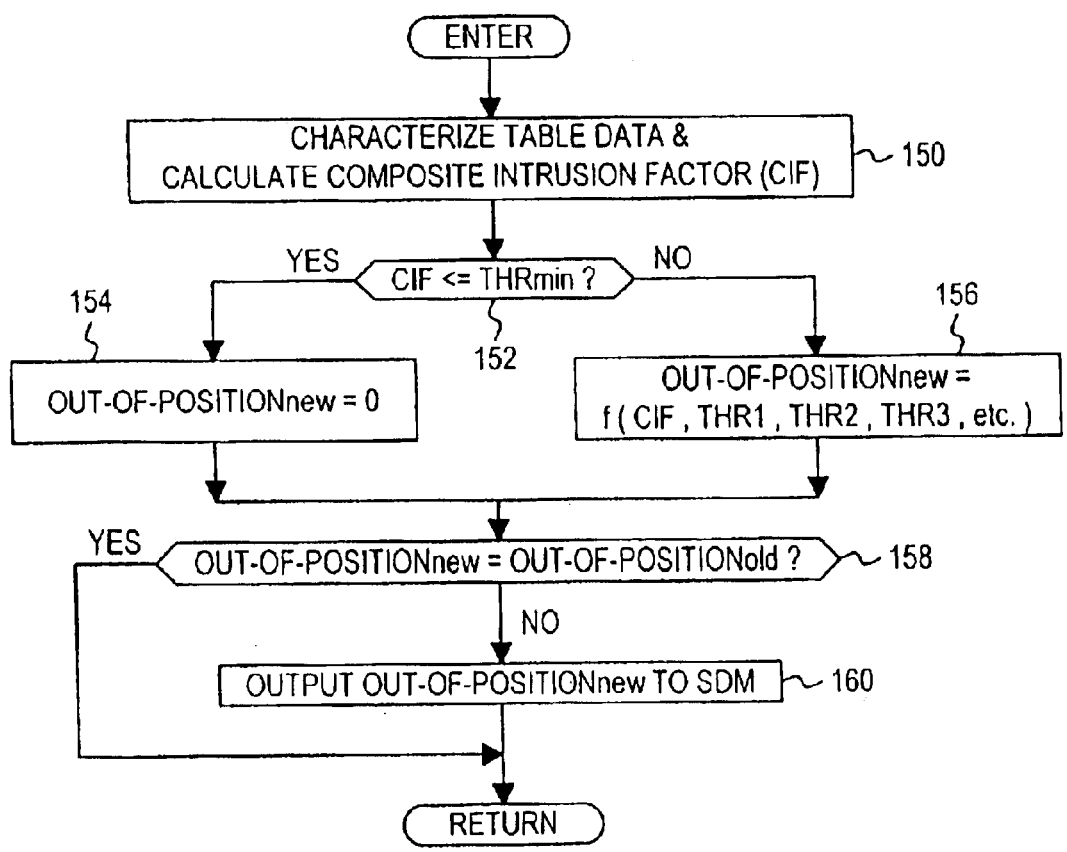
FIG. 4 illustrates an out-of-position table generated by the software routine of FIG. 3 according to this invention.

The flow diagrams of FIGS. 3 and 5 represent software routines executed by the microprocessor 48 in carrying out the above-described control functions. FIG. 3 is a routine that is periodically executed to activate a selected LED of array 50, and to receive and evaluate the reflected signal, and FIG. 5 details the portion of the routine concerning out-of-position evaluation. FIG. 4 schematically depicts a table of intrusion factors developed by the routine of FIG. 3.

Referring to FIG. 3, the blocks 110, 112, 114, 116, 118, 120 and 122 are executed in sequence to activate a selected LED element of array 50 and to sample a signal corresponding to the reflected IR energy in Sample-and-Hold circuit 98. Block 110 selects the LED to be activated, but before activating the selected LED at block 120, blocks 112, 114, 116 and 118 are executed to adjust the receiver and emitter circuit gains based on the beam intensity signal previously received for that LED. If the previous beam intensity signal was less than a lower threshold LT1, the block 112 increases the gain of programmable gain amplifier 96, whereas if the previous beam intensity signal was greater than an upper threshold UT1, the block 114 decreases the gain of programmable gain amplifier 96. If the previous normalized beam intensity signal was less than a lower threshold LT2, the block 116 increases the activation current of programmable current source 84, whereas if the previous normalized beam intensity signal was greater than an upper threshold UT2, the block 114 decreases the activation current of programmable current source 84. As mentioned below in reference to block 130, the normalized beam intensity signal is a beam intensity signal that is normalized for variations in the commanded LED activation current.

Once the LED element selected at block 110 is activated by block 120, the blocks 122 and 124 are repeatedly executed as indicated to acquire a desired number of samples of the beam intensity signal produced by programmable gain amplifier 96. When the desired number of samples has been acquired, the block 126 reads the new beam intensity signal, the block 128 adjusts the new signal for the DC offset voltage of the LED activation current, and the block 130 normalizes the adjusted signal value to compensate for the commanded amplitude of the LED activation current. Then the block 132, 134, 136 and 138 determine an intrusion factor based on the normalized and adjusted signal value, and store the result in an intrusion table as schematically depicted in FIG. 4. Each location of the intrusion table corresponds to an individual LED element of array 50 and its associated illumination point within the out-of-position zone 26, and stores the status of a BEAM flag (BF) and the value of an Intrusion Factor (IF) for that LED element. The block 132 determines a threshold intensity by table-look-up based on the position of the selected LED element within the out-of-position zone 26, and block 134 determines if the normalized and adjusted signal value is at least as great as the threshold. If block 134 is answered in the negative, block 136 clears the BEAM flag and the Intrusion Factor for the selected LED; otherwise, the block 138 sets the BEAM flag and computes a new Intrusion Factor for the selected LED. In general, the Intrusion Factor is proportional to the amount by which the normalized and adjusted signal value exceeds the respective threshold, and preferably also includes a weight or gain factor that is higher for the more critical positions (that is, the positions having the most relevance to a deploy/no deploy decision by SDM 22) within the out-of-position zone 26. The threshold value determined at block 132 similarly depends on the position of the selected LED element within the out-of-position zone 26; the more critical positions have a lower threshold than the less critical positions in order to emphasize the most critical out-of-position information. As indicated at block 140, the above-described procedure is repeated for each of the LED elements of the array 50, whereafter the block 142 signals the execution of the intrusion evaluation routine of FIG. 5.

Referring to FIG. 5, intrusion evaluation involves determining a composite intrusion factor (CIF) based on the individual intrusion factors stored in the table of FIG. 4, and developing an out-of-position signal based on the determined CIF value. Thus, the CIF value is determined at block 150 by characterizing the table data using a number of empirically derived rules quantifying the degree of occupant intrusion into the out-of-position zone 26. The rules tend to be heuristic in nature, and when taken together, produce a CIF value that represents the degree of truth that an occupant has intruded into the out-of-position zone 26 to an extent that air bag deployment should be disabled. For example, the cells of the intrusion factor table for which the BEAM flag is cleared may be ignored, and the remaining cells may be characterized based on the contiguous area of the detected intrusion, as well as the extent of the intrusion. If the determined CIF value is less than or equal to a minimum threshold THRmin, as determined at block 152, the block 154 is executed to set the out-of-position signal (OUT-OF-POSITIONnew) to zero. If the determined CIF value exceeds THRmin, the block 156 compares the CIF value to successively higher thresholds THR1, THR2, THR3, etc. defining different levels of intrusion, and sets OUT-OF-POSITIONnew to a value based on the level into which the CIF value falls. The blocks 158 and 160 then output the out-of-position signal to SDM 22; if OUT-OF-POSITIONnew is different than its previous value (OUT-OF-POSITIONold), the new value OUT-OF-POSITIONnew is provided to SDM 22.

In summary, the present invention provides an improved infrared occupant intrusion detection system and method that is low in cost, and provides accurate and reliable occupant intrusion information at a speed sufficient to timely inhibit or otherwise control deployment of occupant restraints. As pointed out above, the illustrated embodiment is intended to be exemplary in nature, and it is expected that various modifications in addition those mentioned above will occur to those skilled in the art. For example, the present invention is applicable to seats other than the illustrated passenger seat. Also, a different number or pattern of IR beams may be used, and so on. Accordingly, it will be understood that systems and methods incorporating such modifications may fall within the scope of this invention, which is defined by the appended claims.

What is claimed is:

1. A system for detecting a position of an occupant of a motor vehicle including an IR transmitter for emitting a beam of IR light through a first optical lens for reflection off the occupant, an IR receiver for receiving the reflected IR light through a second optical lens, and a controller coupled to the IR transmitter and IR receiver for determining the position of the occupant relative to a predefined out-of position zone of the vehicle, the an improvement wherein:

the IR transmitter includes an array of IR light emitters that are consecutively activated to emit individual beams of IR light through said first optical lens in a predetermined pattern within said out-of-position zone;

the IR receiver generates an output signal corresponding to an intensity of the reflected IR light for each of the emitted IR beams; and the controller:

determines an individual intrusion factor for each emitted IR beam based a comparison of the receiver output signal for that beam and a threshold intensity for that beam;

determines a composite intrusion factor based on the individual intrusion factors for all of the emitted beams; and develops an out-of-position signal based on the composite intrusion factor for indicating a relative intrusion of the occupant into the out-of-position zone.

2. The improvement of claim 1, wherein any given individual intrusion factor is determined according to an amount by which a respective receiver output signal exceeds a respective threshold intensity.

3. The improvement of claim 2, wherein the given individual intrusion factor is set to zero if the respective receiver output signal is less than the respective threshold intensity.

4. The improvement of claim 1, wherein the threshold intensity for determining a given individual intrusion factor is determined according to a position of the respective emitted IR beam in said out-of-position zone.

5. The improvement of claim 1, wherein the individual intrusion factor for a given emitted IR beam includes a gain factor determined according to a position of the given emitted IR beam in said out-of-position zone.

6. The improvement of claim 1, wherein the composite intrusion factor indicates a degree of truth that the occupant has intruded into the out-of-position zone.

7. The improvement of claim 1, wherein the out-of-position signal is determined by comparing the composite intrusion factor to a plurality of predefined thresholds defining different levels of occupant intrusion into the out-of-position zone.

8. The improvement of claim 1, wherein the controller outputs the out-of-position signal to an occupant restraint system for determining whether or how forcefully to deploy occupant restraints, and the controller outputs a newly developed out-of-position signal only if it differs from the previously developed out-of-position signal.

9. A method of detecting intrusion of an occupant of a motor vehicle into a predefined out-of-position zone of the vehicle, including the steps of:

emitting successive beams of IR light through a first optical lens in a predetermined pattern within said out-of-position zone for reflection off the occupant;

receiving reflected IR light beams through a second optical lens, and generating an output signal corresponding to an intensity of the received IR light beam for each of the emitted IR light beams;

determining an individual intrusion factor for each emitted IR light beam based a comparison of a respective output signal and a respective threshold intensity, determining a composite intrusion factor based on the individual intrusion factors for all of the emitted IR light beams; and developing an out-of-position signal based on the composite intrusion factor for indicating a relative intrusion of the occupant into the out-of-position zone.

10. The method of claim 9, wherein any given individual intrusion factor is determined according to an amount by which a respective receiver output signal exceeds a respective threshold intensity.

11. The method of claim 10, wherein the given individual intrusion factor is set to zero if the respective receiver output signal is less than the respective threshold intensity.

12. The method of claim 9, wherein the threshold intensity for determining a given individual intrusion factor is determined according to a position of a respective emitted IR beam in said out-of-position zone.

13. The method of claim 9, wherein the individual intrusion factor for a given emitted IR beam includes a gain factor determined according to a position of the given emitted IR beam in said out-of-position zone.

14. The method of claim 9, wherein the composite intrusion factor indicates a degree of truth that the occupant has intruded into the out-of-position zone.

15. The method of claim 9, wherein the out-of-position signal is determined by comparing the composite intrusion factor to a plurality of predefined thresholds defining different levels of occupant intrusion into the out-of-position zone.

16. The method of claim 9, including the steps of:

outputting the out-of-position signal to an occupant restraint system for determining whether or how forcefully to deploy occupant restraints; and outputting a newly developed out-of-position signal only if it differs from the previously developed out-of-position signal.

* * * * *